(12) United States Patent
Walecki et al.

(10) Patent No.: US 10,621,739 B2
(45) Date of Patent: Apr. 14, 2020

(54) CHARACTERIZATION OF SPECULAR SURFACES

(71) Applicant: APPLEJACK 199 L.P., San Jose, CA (US)

(72) Inventors: Wojciech J Walecki, Sunrise, FL (US); Wei-Chun Hung, San Jose, CA (US)

(73) Assignee: APPLEJACK 199 L.P., Milpitas, CA (US)

( * ) Notice: Subject to any disclaimer, the term of this patent is extended or adjusted under 35 U.S.C. 154(b) by 226 days.

(21) Appl. No.: 15/937,677

(22) Filed: Mar. 27, 2018

(65) Prior Publication Data

US 2019/0304110 A1    Oct. 3, 2019

(51) Int. Cl.
*G06T 7/40* (2017.01)
*G01B 11/00* (2006.01)
*G01B 11/30* (2006.01)
*G01B 11/16* (2006.01)

(52) U.S. Cl.
CPC .............. *G06T 7/40* (2013.01); *G01B 11/002* (2013.01); *G01B 11/167* (2013.01); *G01B 11/303* (2013.01); *G06T 2207/10024* (2013.01); *G06T 2207/10152* (2013.01)

(58) Field of Classification Search
CPC . G01B 11/2504; G01B 11/303; G01B 11/002; G01B 11/25; G01B 11/167; G06T 2207/10024; G06T 7/40; G06T 2207/10152
See application file for complete search history.

(56) References Cited

U.S. PATENT DOCUMENTS

| 2009/0116697 A1* | 5/2009 | Shalaby | G01B 5/28 382/108 |
| 2017/0365065 A1* | 12/2017 | Stigwall | G06T 7/55 |
| 2019/0356836 A1* | 11/2019 | Ida | G06T 7/97 |

* cited by examiner

*Primary Examiner* — Yon J Couso
(74) *Attorney, Agent, or Firm* — Maschoff Brennan

(57) ABSTRACT

The present subject matter at-least provides a system for measurement of topography of specular surfaces. The system comprises a set of indexed light-sources and a controller configured to drive the set of light-sources for irradiating a specular-surface by sequentially illuminating a plurality of sub-sets of the light-sources in accordance with a pre-defined encoding criteria. Further, at least one camera is provided to capture reflected light-radiation from the specular-surface and thereby generate a plurality of images in accordance with the sequential-illumination, such that each of the generated-image corresponds to a particular sub-set of illuminated light sources. Further, a processing system is configured to process each generated image in accordance with an image-processing criteria specific to the encoding-criteria to determine one or more index of light-sources and thereby identify the light-sources within the images; and determine topography of the specular-surface at-least based on calculation of spatial-coordinates and the determined identity of each light-source.

16 Claims, 11 Drawing Sheets

CHARACTERIZATION OF SPECULAR SURFACES

TECHNICAL FIELD

The embodiments discussed in this disclosure are related to characterization of specular-surfaces.

BACKGROUND

Various mechanisms and systems exist to determine topography and respective changes therein with respect to surfaces. An example-system 100 known in the art for determining geometry of a curved smooth-specular surface 102 is illustrated in FIG. 1. The constituent-components of the system 100 include a light-source array 104, and a camera 106. An optical-ray 108 emitted from light source array 104 impinges curved surface 102 in point 110, and becomes reflected in form of the ray 112. The position in space of the ray 112 is determined by the camera 106.

When position of the point 114 is known and the position of the point 110 at which ray 203 is impinging measured curved surface 204 in terms of a coordinate (say z coordinate of a cartesian coordinate system acting as frame of reference) is known, then a local 3D slope of the smooth surface, or equivalently one or more parameters describing a plane 116 which is tangential to the curved-surface 102 may be determined.

In some instances, with respect to the system 100, in order to determine parameters of the plane 116, an exact position of the point 114 (e.g., position in three-dimensional space) may need to be established. This may be performed using a flat-mirror 202 as shown in FIG. 2. The flat-mirror 202 is placed at in a position approximating position of the curved-surface 104 shown in FIG. 2. The position of the ray emanating from point 114 is measured for two different positions of the mirror 202 separated by known distance H. As may be understood by a person skilled in the art, such measurement uniquely determines position of the point 114 in three-dimensional space or in other words, an object-space position of plurality of LEDs or any other light emitting source.

Yet, in order to measure object space position of a plurality of the light emitting devices (LED) residing on the light source array 104, one may need to properly identify which image of the LED corresponds to which LED within the light source array 104. In other words, there may be a requirement that LEDs captured in the image need to be mapped with the actual LEDs as present within the array 104.

In an operation as associated with FIG. 2, when the plurality of LEDs residing on the light source array 104 are simultaneously energized, the camera 106 records a plurality of spots corresponding to different LEDs within the image. When the height 'H' of the mirror 202 changes, the positions of light-spots observed by the camera 106 move as well within the image generated by the camera 106. If the magnitude of H is large, such movement may be also large with comparison to spacing between LEDs within the light source array 104. In order to properly determine object-space coordinates for the point 114, it may thereby be necessary to properly identify which LED in the array 104 corresponds to which spot or point observed at the focal-plane of the camera 106 and reproduced within the image.

At least in order to enable identification of the LEDs from the captured and electronically generated images, one could in principle energize only one LED at the time and perform measurements as described in FIG. 2 while having one LED illuminated at particular instant of the time. However, owing to a fact that the array of LEDs 104 may contain large number of LEDs (e.g., ranging from $10^4$ to $10^7$), the measurement of curved surfaces may require a large amount of time also (e.g., time of the order of $10^4$-$10^8$ seconds in some instances) or may take a substantial number of hours to perform. Accordingly, the approach of performing measurements based on illumination of individual LEDs is impractical and proves burdensome in long run.

SUMMARY

This summary is provided to introduce a selection of concepts in a simplified format that are further described in the detailed description of the present disclosure. This summary is neither intended to identify key or essential inventive concepts of the disclosure, nor is it intended for determining the scope of the invention or disclosure.

In one embodiment, the present subject matter provides a system for measurement of topography of specular surfaces. The system comprises a set of indexed light-sources and a controller configured to drive the set of light-sources for irradiating a specular-surface by sequentially illuminating a plurality of sub-sets of the light-sources in accordance with a pre-defined encoding criteria. Further, at least one camera is provided to capture reflected light-radiation from the specular-surface and thereby generate a plurality of images in accordance with the sequential-illumination, such that each of the generated-image corresponds to a particular sub-set of illuminated light sources. Further, a processing system is configured to process each generated image in accordance with an image-processing criteria specific to the encoding-criteria to determine one or more index of light-sources and thereby identify the light-sources within the images; and determine topography of the specular-surface at-least based on calculation of spatial-coordinates and the determined identity of each light-source.

In an implementation, the aforesaid topography measurement system may be further appropriated to determine stress-induced changes in topography of specular surfaces owing to deposition of coating/thin-films and thereby determine stress in coating or thin-films. For example, the present topography measurement system may be further utilized to study thin-film stress induced changes in topography of a glass panel and thereby determine stress in the thin-film deposited at the glass-panel in accordance with the procedure as outlined in Finot, M, Blech, I. A., Suresh, S. and Fujimoto, H., *J. Appl. Phys.*, 1997, 81, 3457

In one embodiment, the present subject matter provides a system for measurement of topography of specular-surfaces, the system comprises an LED panel comprising a set of indexed LEDs. An LED-controller is configured to drive the LED panel for irradiating a specular-surface by sequentially illuminating a plurality of sub-sets of the LEDs within the panel in accordance with a pre-defined encoding criteria. At least one camera is configured to capture reflected light-radiation from the specular-surface and thereby generate a plurality of images in accordance with the sequential-illumination, wherein each of the generated-image corresponds to a particular sub-set of illuminated LEDs. A processing system is configured to process each generated image in accordance with an image-processing criteria specific to the encoding-criteria to determine one or more index of LEDs and thereby identify the LEDs of panel within the images;

and determine topography of the specular-surface at-least based on calculation of spatial-coordinates and the determined identity of each LED.

To further clarify advantages and features of the invention claimed herein, example descriptions and embodiments are rendered by reference to specific embodiments thereof, which is illustrated in the appended drawings. It is appreciated that these drawings depict only example embodiments of the invention and are therefore not to be considered limiting of its scope. The disclosure will be described and explained with additional specificity and detail with the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
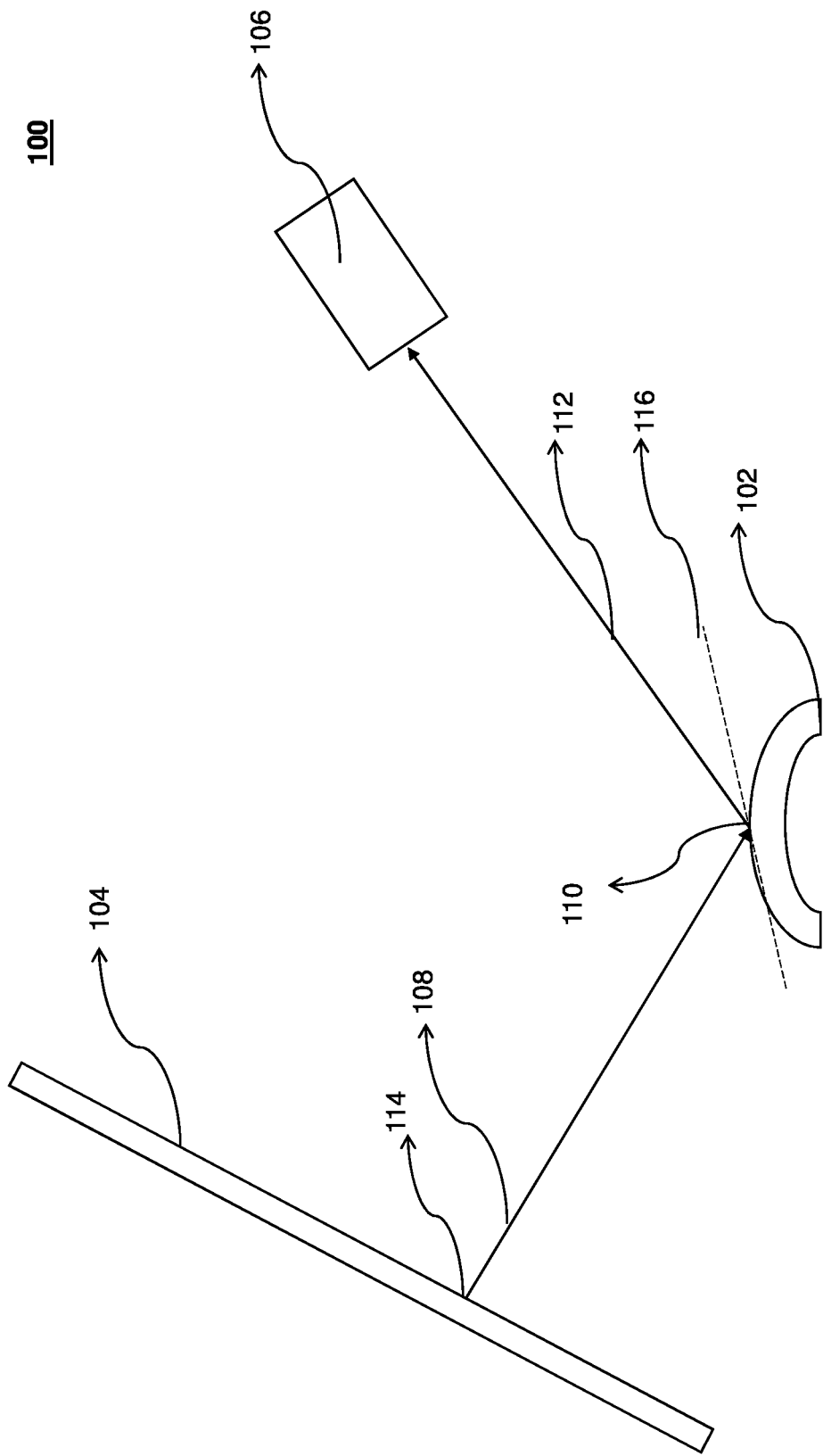
FIG. 1 illustrates a known mechanism of determining topography of a specular-surface.

The elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

The foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this present disclosure belongs. The system, methods, and examples provided herein are illustrative only and not intended to be limiting.

Embodiments of the present disclosure will be described below in detail with reference to the accompanying drawings.

Figure 2:
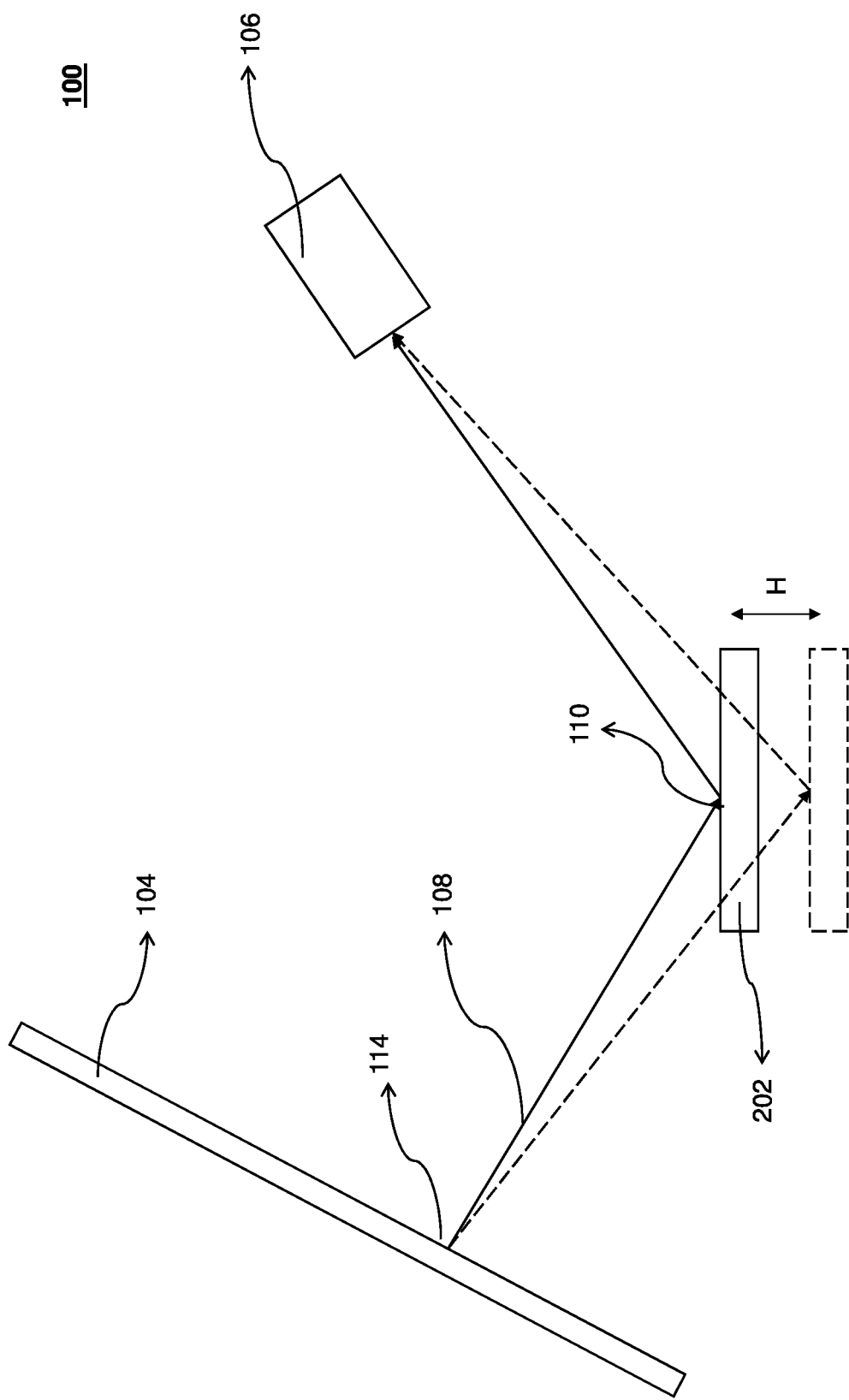
FIG. 2 illustrates a known mechanism of determining object-space positions of individual light sources for the purposes of determination of topography as illustrated in FIG. 1.

FIG. 1 illustrates a known system for determining topography of a specular-surface. Further, FIG. 2 illustrates a known system for determining object-space positions of individual light-sources for the purposes of determination of topography as illustrated in FIG. 1. Both FIG. 1 and FIG. 2 stand explained with respect to 'BACKGROUND' section of the present document.

Figure 3:
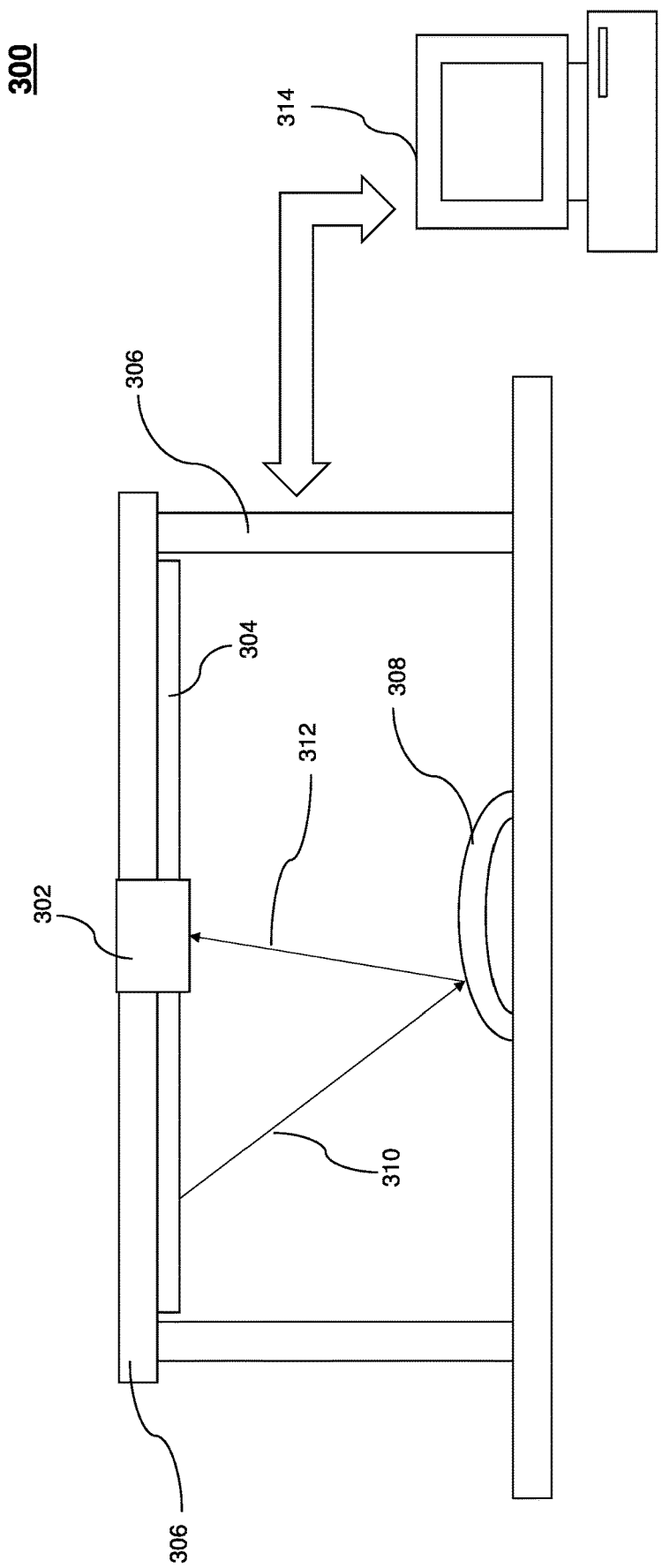
FIG. 3 illustrates an example-system for determining topography and thereby stress-measurement with respect to the specular-surface according to the present disclosure.

FIG. 3 illustrates an example-system for determining topography and/or determining stress with respect to the specular-surface, in accordance with an embodiment of the present subject matter. More specifically, the apparatus 300 may include a camera 302, an array of LED (light emitting diodes) arranged as an LED panel 304, and supporting bars 306 supporting the LED panel 304. Further, a specular-surface 308, whose topography may be measured, resides beneath the LED panel 304 for irradiation therefrom.

The LED panel 304 is configured to irradiate the specular-surface 308 through a light-ray 310. The camera 302 is configured to capture reflected-light ray 312 as reflected from the specular-surface 308. The camera 302 may in turn include a detector unit e.g., a CMOS sensor or charge coupled device coupled to a computing system 314 configured to generate electronic-images corresponding to the LEDs within the LED panel 304. In addition, the computing system may be also configured to control the illumination in the LED panel 304 as elaborated in the description of FIG. 6

Further, the computing system 314 may be configured to detect a change in optical path of the reflected beam of light to determine topography and thereby measure stress with respect to the specular-surface 308.

Further, as may be understood, the object-space positions (position in accordance with a three-dimensional Cartesian coordinate-system) of a light-source (e.g., an LED) within the LED panel is determined by replacement of the specular-surface 308 with the flat-glass plate acting as the specular-surface, as elaborated in accordance with the foregoing description of FIG. 2.

Further, while the foregoing description illustrates usage of LEDs as the light sources, the same may also be construed to cover other light-emitting sources such as incandescent, fluorescent. In addition, the light-emitting source may also be an assembly comprising an illumination source, polarizers, and light-transmitters such as a liquid-crystal.

Figure 4:
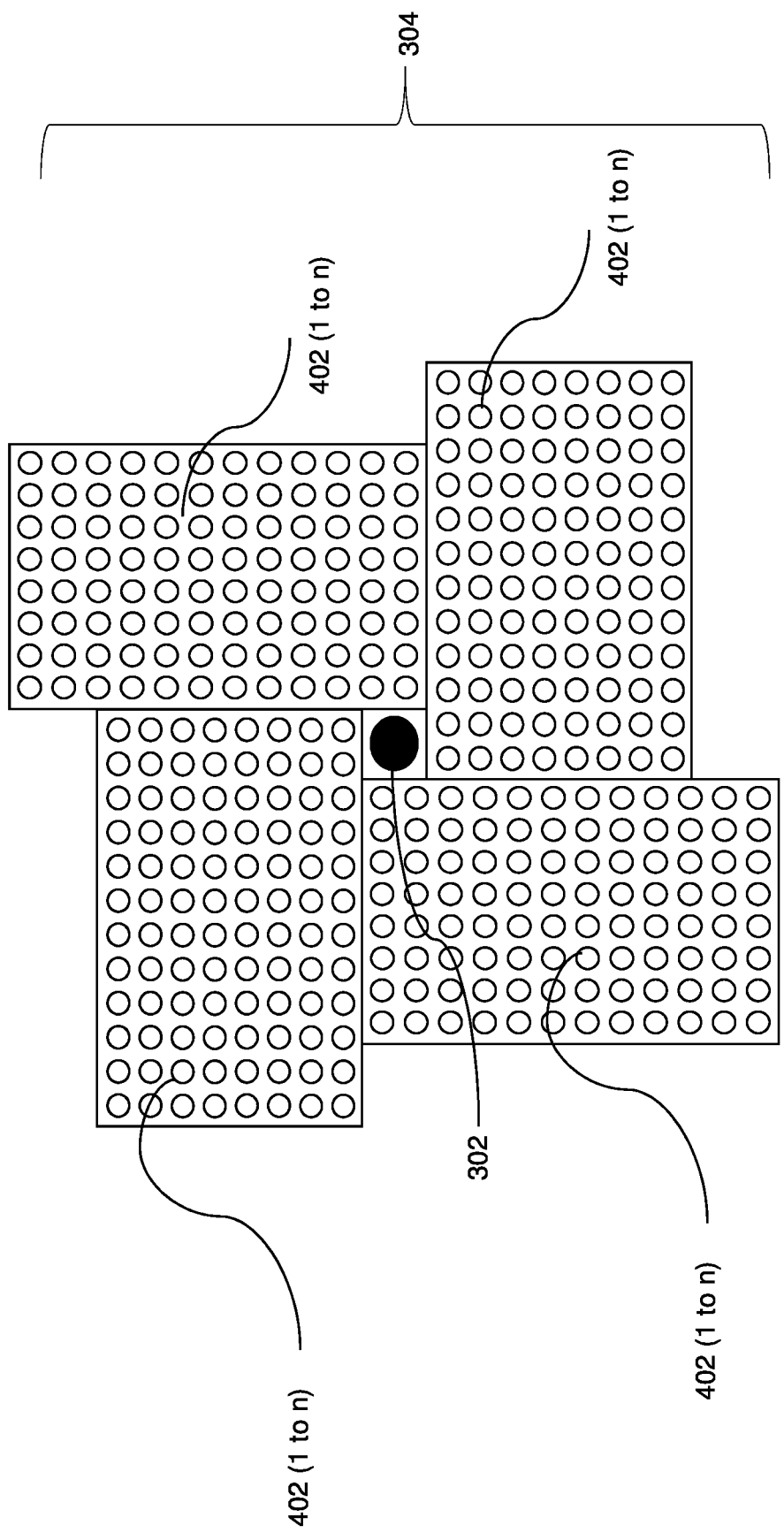
FIG. 4 illustrates an example arrangement of the light-sources and camera forming a part of the system as depicted in FIG. 3 according to the present disclosure.

FIG. 4 illustrates an example arrangement of the point light-sources 402 (1 to n) within the panel 304 and the camera 302 forming a part of the system 300 as depicted in FIG. 3. While the 'n' light-sources 402 may be LEDs, the camera 302 may be any imaging-device capable of generating electronic images based on the captured illumination. In an example, the camera 302 may be a pin-hole camera adapted to measure a direction of propagation of the light reflected from a curved or flat specular surface. As may be understood in respect of a simplified two-dimensional model of the pin-hole camera, a light-ray entering the aperture of camera impinges a photo-detector (located at the focal-plane of the camera) at a point whose y-coordinate depends upon an angle (say a) as described by the light-ray (during entering) at the aperture of the camera with respect to the normal.

Figure 5:
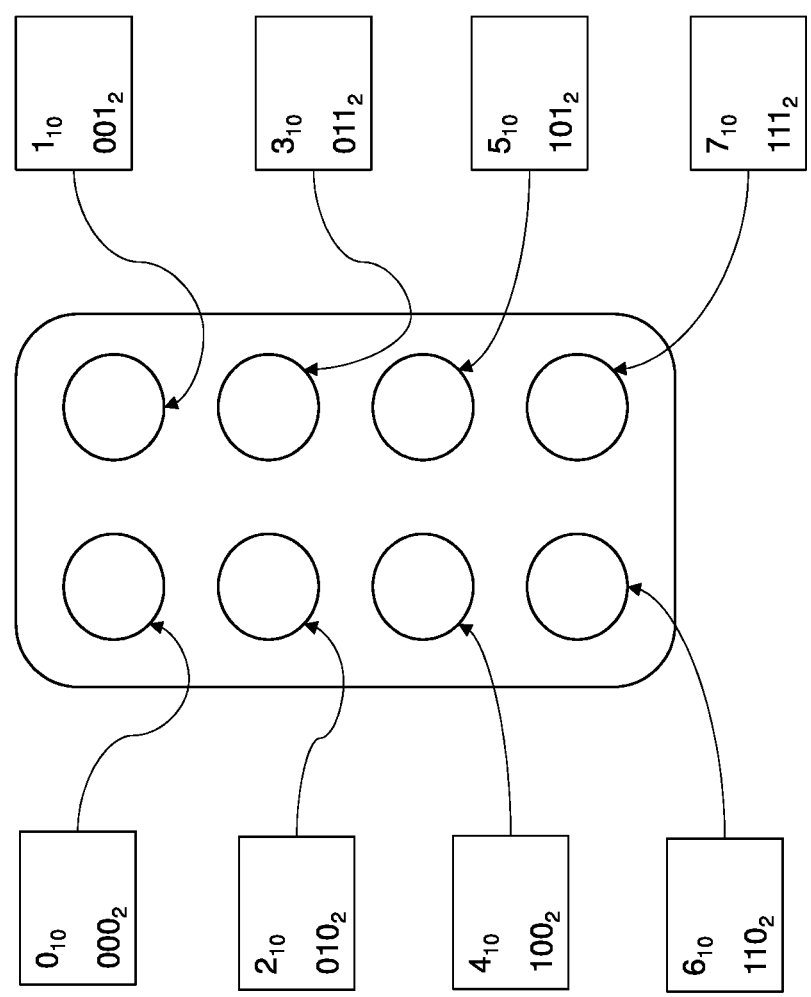
FIG. 5 illustrates an example panel of indexed LEDs forming a part of the system as depicted in FIG. 3 according to the present disclosure.

FIG. 5 illustrates an example panel of indexed LEDs forming a part of the system as depicted in FIG. 3. More specifically, the present figure depicts a scenario where 'n' number of LEDs is 8. Accordingly, the entire number of LEDs has been shown indexed from 0 to 7 in 'decimal' numeral-system and '000 to 111' in accordance with 'binary' numeral system. In other words, the present figure considers a small array of LEDs for illustrative purposes. This array comprises 8 light sources having decimal indices i=0, 1, 2, 3, 4, 5, 6, and 7. Both the binary and decimal representation of these indices is shown in present figure.

Figure 6:
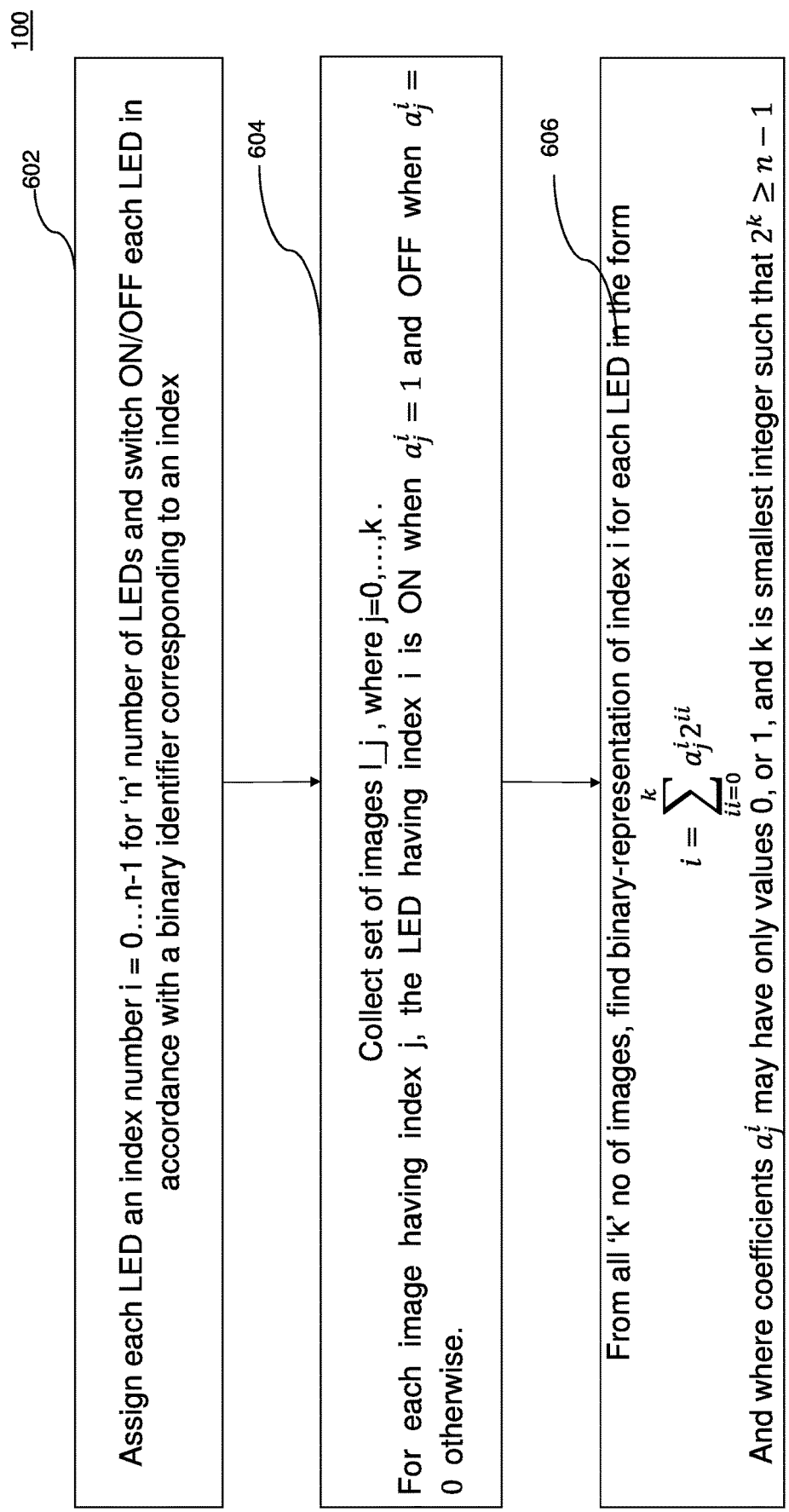
FIG. 6 illustrates an example control-flow of operation of the system as depicted in FIG. 3 according to the present disclosure.

FIG. 6 illustrates an example control-flow of operation of the system as depicted in FIG. 3.

At step 602, each LED is assigned an index uniquely identifying each LED. This index may be an integer number i ranging from 0; to n−1 where n is total number of LEDs. Thereafter, different sub-sets of LEDs out of the main set are created and illuminated sequentially such that each LED gets switched ON/OFF in accordance with a binary-pattern (e.g., pre-defined encoding criteria) that corresponds to a binary-number equivalent of the index pertaining to each LED. As may be understood, 'ON' state of LED represents binary '1' and 'OFF' state represents binary '0'.

The aforesaid number of different sub-sets of LEDs are determined as a function of total number of LEDs present within the panel. For such purposes, a binary-logarithm 'k' is computed with respect to 'n' number of LEDs, e.g., $k = \log_2 n$, such that $2^k \geq n-1$ Thereafter, 'k' number of sub-sets of LEDs are created for illumination within the panel, wherein each of the sub-set of LEDs denotes a pre-defined number of LEDs less than 'n' number of LEDs. The 'k' sub-sets of the LEDs are illuminated in the panel in accordance with a pre-defined sequence to cause switching on/off each LED in accordance with the respective binary identifier. For example, the pre-defined sub-sets of LEDs are illuminated within the panel such that an LED indexed as 6 whose binary equivalent is '110' exhibits a pattern ON, ON, OFF.

Such action of step 604 is managed by an LED controller forming a part of the computing system 314.

In step 604, the 'k' number of images of the flat glass specular-surface (e.g., flat glass plate that replaces curved specular surface 308) are collected. More specifically, the camera 302 is configured to capture reflected light-radiation from the specular-surface and thereby generate the 'k' number of images in accordance with the sequential-illumination, wherein each of the generated images corresponds to a particular sub-set of illuminated LEDs. In other words, each image defines a particular bit of the binary-sequence for all the LEDs.

In step 606, the number of images as collected are analyzed by a processing-system forming a part of the computing system 314 for ascertaining a binary-representation of the index i for each LED, wherein each of image out of 'k' number of images corresponds to a particular subset of energized LEDs and accordingly a particular bit of the binary representation. In an example, the first image corresponds to "Least Significant bit" of the binary representation for each LED and the last image represents most significant bit (MSB) for each LED. Accordingly, the index in decimal notation for each LED observed by the camera 302 may be calculated using formula $$i = \sum_{ii=0}^{k} a_j^i 2^{ii}$$

In the above formula ii is consecutive image number or a bit-position/number with respect to the binary representation of the index. For example, ii=0 represents LSB and ii=k represents MSB of the binary representation. Accordingly, i may be calculated as a number in terms of decimal numeral system (e.g., as 1, 2, 3, 4, and so on) for each LED from the correspondingly obtained binary sequence.

Accordingly, once the index i is determined for each LED, the identification of the LED is executed from the images. As may be understood, only k number of images may be required to be processed for identifying each LED out of the 'n' number of LEDs, instead of needing 'n' number of images for 'n' number of LEDs. Accordingly, the binary approach greatly reduces number of needed images collected by camera. In an example, the number of images needed to fully identify positions of the really large $10^6$ LEDs within the LED panel is only 20, which can be accomplished in the reasonable time not exceeding few minutes.

In addition, the measurements of object space positions, e.g., the determination of coordinates of the LEDs within the LED panel is performed in parallel through another processing system forming a part of the computing system 314. Multiple LEDs (e.g., all in some instances) may be identified at the same-time (owing to index determination for each LED as the same time from k number of images), and thereby the glass-plate or the flat mirror specular surface 202 shown in FIG. 2 may be moved only once in some instances.

Another example processing-system for determination of the position-coordinates of LEDs may include a set of instructions executable by a processor and stored within the memory of the computing system 314. In operation, a 'change' is noted with respect to a 'point' in the detector's frame of reference in the camera 302 upon displacement of the mirror of the glass plate 202 (e.g., displacement being by 'H'). Such 'point' in the frame of reference represents the point of impingement by the reflected ray as detected by the detector within the camera 302. Thereafter, the observed 'change' in coordinates at the detector is compared with the magnitude of 'displacement' of the glass-plate 202. Based on such drawn comparison and the determined 'index' for each LED, the position coordinates for each LED in the panel is ascertained by the another processing system.

At least due to process of binary-identifier driven illumination for each LED followed by capturing of the binary-identifier with respect to each LED from the entire set of images simultaneously, a substantially increased speed in terms of measurement of the specular surfaces is achieved owing to the fact that the LEDs are illuminated in groups or sub-sets, unlike the conventional naïve measurement methods that are based on illuminating one LED at a time. Moreover, since the position-space coordinates of each of multiple LEDs may be determined simultaneously owing to simultaneously determined index for each LED, the flat glass-plate 202 or calibration mirror may be moved less including only once in some instances. Accordingly, the present subject matter may reduce or eliminate a need to move the flat glass or calibration mirror separately for each LED.

Figure 7:
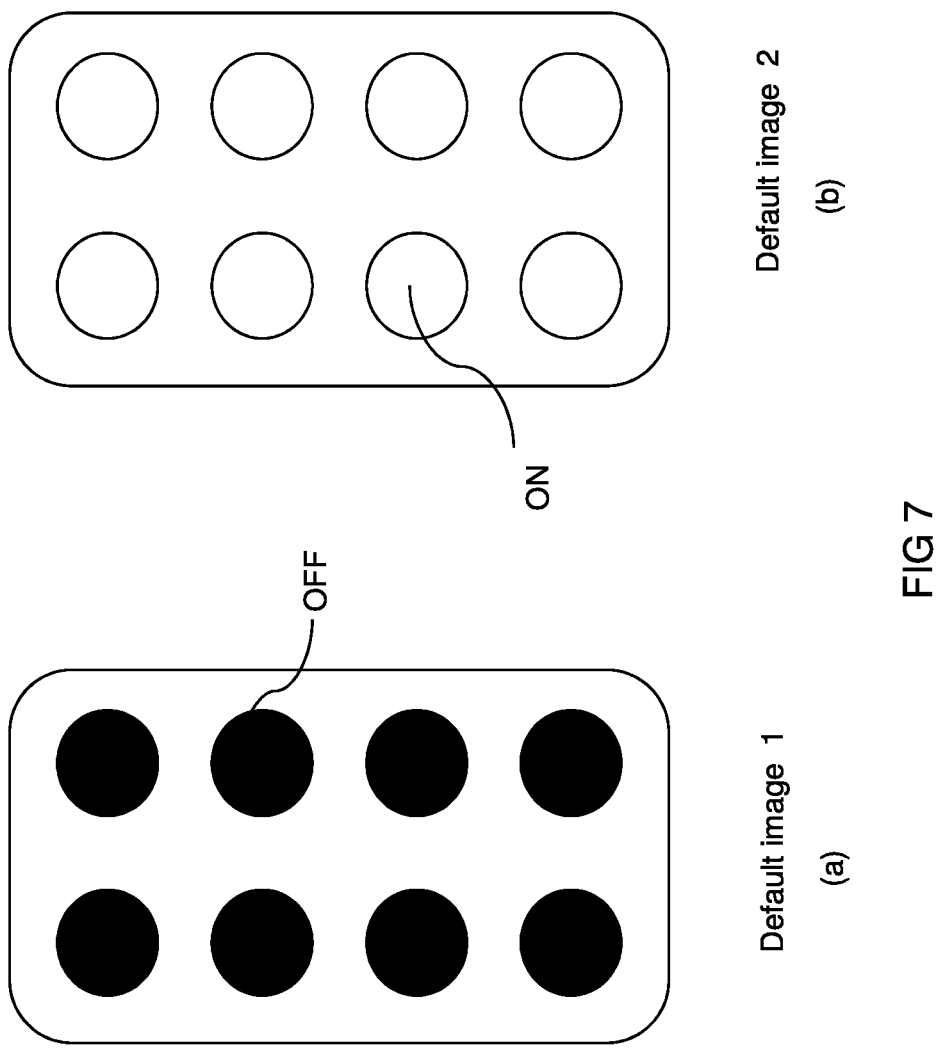
FIG. 7 illustrates example illumination-state of an LED panel as per default settings during calibration of the system as depicted in FIG. 3 according to the present disclosure.

FIG. 7 illustrates example illumination-state of an LED panel as per default-settings during operation of the system as depicted in FIG. 3. As may be observed, the default-settings may require either the entire LED panel in a switched-OFF state as depicted in FIG. 7(*a*) or a fully-illuminated state as depicted in FIG. 7(*b*). Accordingly, the images corresponding to such 'two' differently illuminated-states of the LED panel may be referred prior to the capturing of afore-described 'k' images as a part of 'calibration-settings' of the system. Such 'calibration-settings' include establishing position of all observed-spots by turning the entire array ON and OFF as shown in FIG. 7*a* and FIG. 7*b*. As may be observed, the present-figure continues with the example provided in FIG. 5 and depicts 'n' number of LEDs as 8.

Considering that the camera 302 has a resolution enough to differentiate among all the LEDs of the panel in any given image, centroids for all camera LEDs may be calculated by collecting images of the entire-array when all LEDs are energized and when none of the LEDs are energized as shown in FIG. 7(*a*) and FIG. 7(*b*), respectively.

Figure 8:
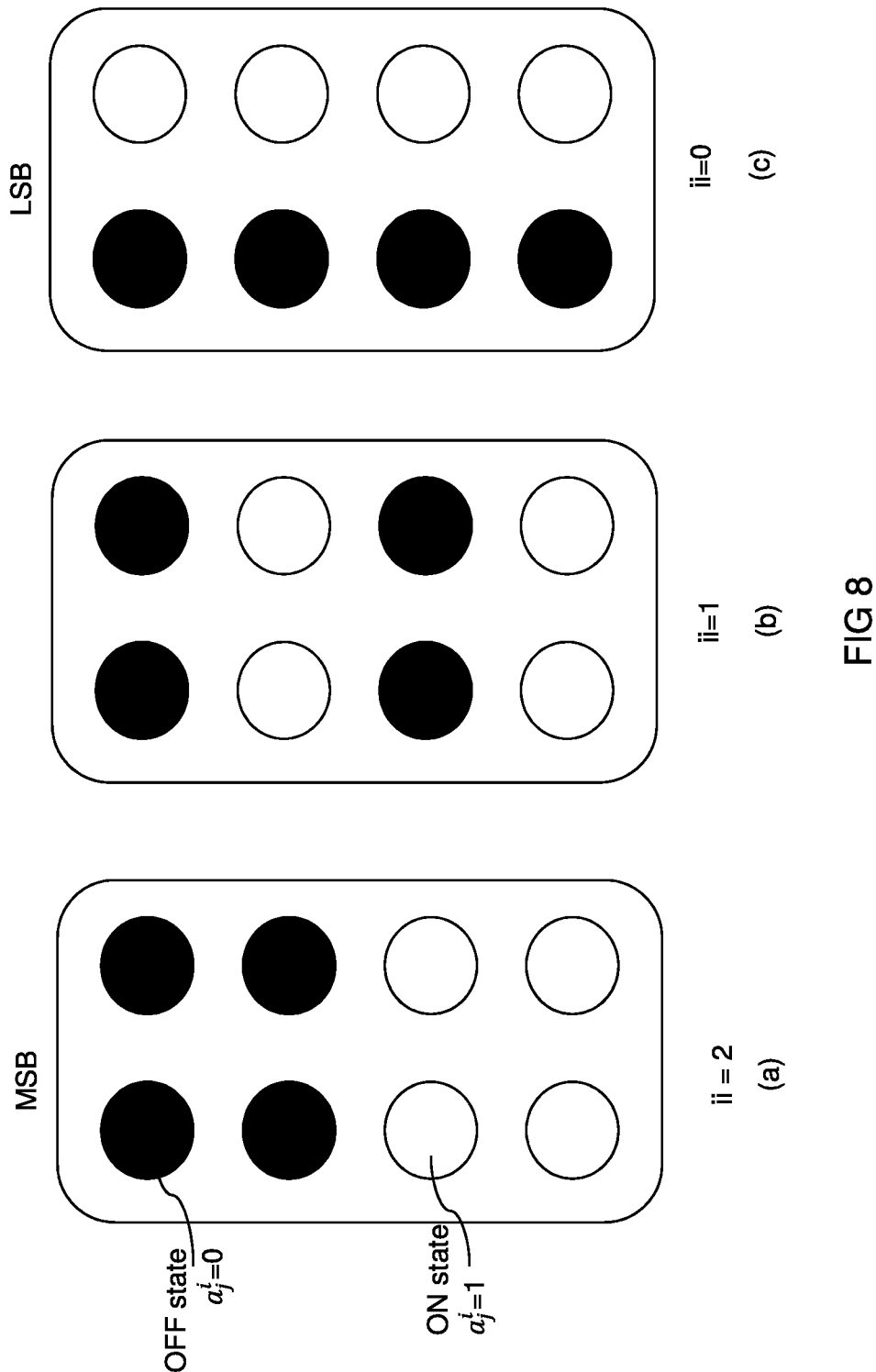
FIG. 8 illustrates example 'illumination-states' of the LED panel during the operation of the system as depicted in FIG. 3 according to the present disclosure.

FIG. 8 illustrates example 'illumination-states' of the LED panel during the operation of the system referred in FIG. 3. More specifically, the present figure continues with the example provided in FIG. 5, and each of the illumination-states of the LED panel as shown from FIG. 8(*a*) till FIG. 8(*c*) correspond to bit-positions or bit-numbers of a binary-identifier as proposed to be captured from '3' images with respect to '8' number of LEDs (decimal index number 0 to 7) present in the panel. Accordingly, the binary-identifiers as proposed to be gathered with respect to each LED may be 3-bits long with values ranging from 000 to 111.

Considering FIG. 8(*a*) that corresponds to MSB of binary-identifier for all LEDs 1 to 8, a particular sub-set of LEDs may be illuminated in the panel to achieve the image as obtained in present FIG. 8(*a*). For example, first four LEDs are switched ON and the rest may be switched OFF in the panel. Similar, different sub-sets of LEDs in the panel are switched ON with respect to FIG. 8(*b*) and FIG. 8(*c*), such that FIG. 8(*b*) and FIG. 8(*c*) correspond to 'middle bit' and 'LSB' of the 3-bit long binary identifier. For sake of reference, FIG. 8(*a*) till FIG. 8(*c*) may be denoted by the bit number ii=0, 1 and 2. Further, as may be also observed from FIG. 8(*a*) till FIG. 8(*c*), a relatively small number (e.g., k=3) of images are observed as compared to a total number of LEDs. Moreover, the binary-identifier or each LED is constructed 'bit-by-bit' by processing the images sequentially, such that any given image includes only a sub-set of 'illuminated' LEDs in the panel.

Figure 9:
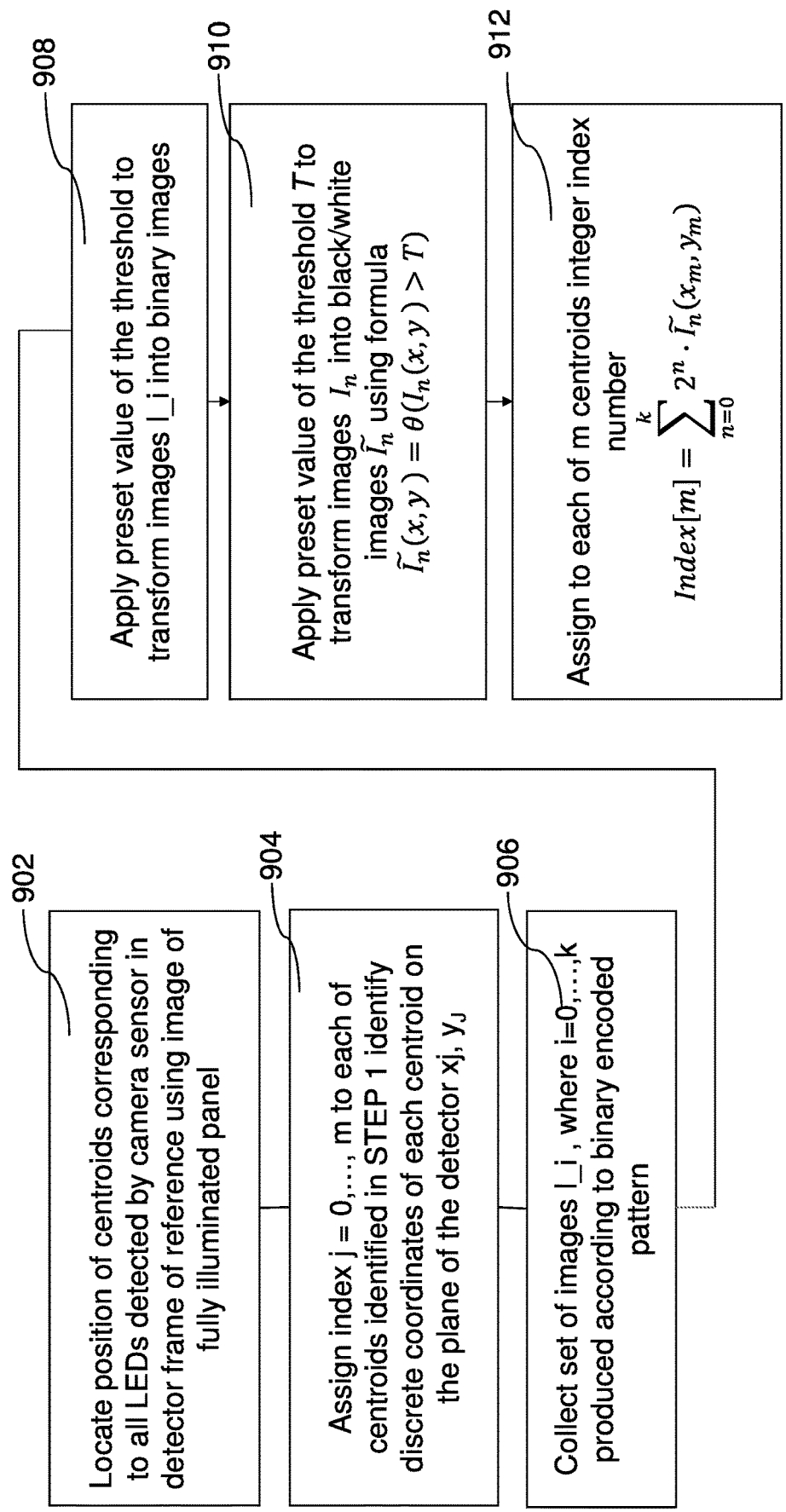
FIG. 9 illustrates another example control-flow of operation of the system as depicted in FIG. 3 according to the present disclosure.

FIG. 9 illustrates another example control-flow of operation of the system as depicted in FIG. 3 and generalizes the control-flow depicted in FIG. 6. The present figure takes into consideration that in-practice, single-rays of light are not observable from the LED panel and spots recorded by the camera 302 within the images have finite-sizes unlike the size of the point-source LED. In addition, measurements are typically not performed in total darkness and there may be a need to establish a threshold value for allowing a differentiation between measurements for ON and OFF states of LEDs. Taking into account these practical concerns, the present FIG. 9 illustrates a practical-implementation of the control-flow as depicted in FIG. 3.

At step 902, position of centroids corresponding to all LEDs detected by the camera-sensor 302 are located at a 'focal-plane' or the 'camera-detector's frame of reference based on an image of a fully illuminated LED panel. As may be understood, a particular centroid represents a plurality of LED based point-sources (e.g., a centroid formed by confluence of three LEDs).

At step 904, an index j=0, . . . , m is assigned to each of the 'm' number of centroids as have been identified in step 902. The index j identifies discrete-coordinates $(x_j, y_j)$ with respect to each identified centroid within the focal-plane of the camera.

Step 906 depicts collection of a set I_i of 'k' number of images based on the binary encoded pattern of example control-flow as depicted in FIG. 6. Each of 'k' number of images is awarded an index 'i', such that i=0 to k At step 908, a pre-defined threshold is applied to transform images I_i into binary-images based on any mechanism known in the existing art.

At step 910, another pre-defined threshold (say T) is applied to transform the binary-images $I_n$ into black/white images $\tilde{I}n$. In an example, the black/white images $\tilde{I}n$ are obtained based on the following mathematical operation in some instances:

$$\tilde{I}_n(x,y) = \theta(I\_n(x,y) > T)$$

As may be understood from the above step 910, if $\tilde{I}n$ (x)>T then centroid is considered in a full-illuminated state and binary '1' is gathered with respect to the centroid from the figure. Else, centroid is considered to be faintly lit and binary '0' is considered to be present.

At step 912, the black and white images as obtained at step 910 undergo image processing to provide the binary-identifier with respect to the m number of centroids (as indexed in step 902 and 904) from the 'k' number of black and white images as obtained at step 910. Based on the gathered binary-identifier with respect to each centroid, the corresponding index number of may be calculated based on in some embodiments:

$$\text{Index}[m] = \sum_{n=0}^{k} 2^n \cdot \hat{I}_n(x_m, y_m)$$

As may be understood from above formula in step 912, the index [m] is calculated in decimal-numeral system and accordingly maps with index j=0, . . . , m as assigned to the centroids in step 904.

Further, control flow as illustrated in the present FIG. 9 may also be generalized to LEDs energized at larger number of 'fluence-levels' instead of merely switched OFF and switched ON state. Such 'fluence-levels' may for example be (e.g. switched OFF state, dull, partially-bright, substantially-bright, extremely-bright and so on). The 'fluence' of LEDs are relatively easily controllable through a 'forward-current' flowing through the LED. Accordingly, it may be initially required as a part of factory-settings to calibrate the emission from the all LEDs and establish proper values of multiple thresholds to differentiate between any two 'fluence-levels'.

For measurement applying N different levels of LED fluences, following k number of measurements or images are needed:

$k(N) = \text{ceil}(\log_N n)$

In the present scenario, different sub-sets of LEDs are sequentially illuminated such that each LED telegraphs its index using numerical-representation with base N. For example for n=10^6 and N=10, we get k (10)=6—which is number of digits needed to represent any number from 1 to 999999 in decimal-representation. Accordingly, a sequence of 'six fluence-levels' exhibited by any LED across the six images is used to derive a 'six-digit' index for the LED. Likewise, the present subject matter may be extended to cover determination of indexes of each of the LEDs through observing other numeral-system based patterns such as tetra-decimal, penta-decimal, hexadecimal etc. Likewise, the indexing of the LEDs may also be done in terms of other reference-numeral based format other than decimal system.

Figure 10:
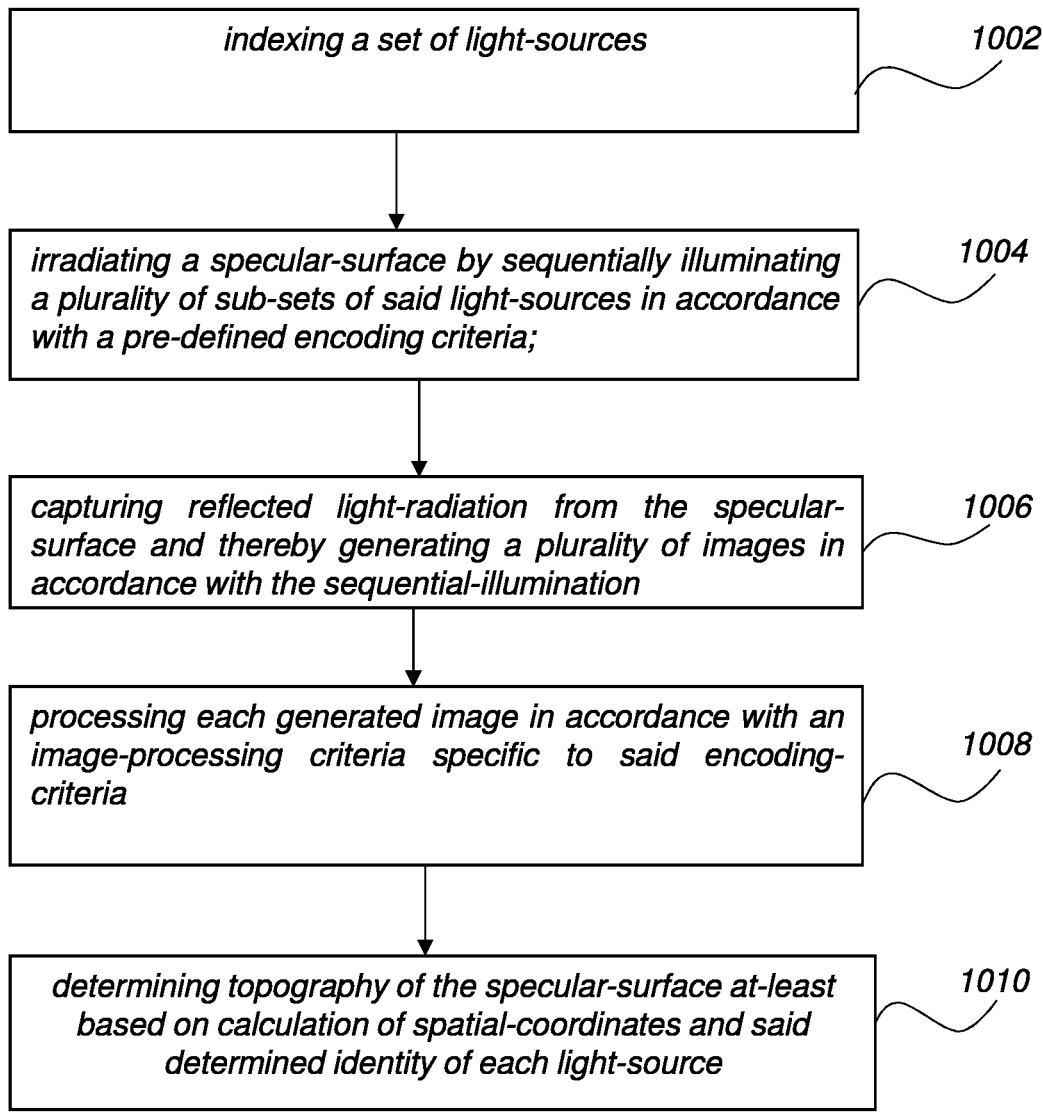
FIG. 10 illustrates an example method executed by the system for determining topography of the specular-surface according to the present disclosure.

FIG. 10 illustrates an example method executed by the system for determining topography of the specular-surface.

At step 1002, a set of light-sources are indexed. In an example, the set of light sources denote LEDs in the LED panel. In other example, the light sources may include an incandescent source; a fluorescent light source, and a liquid-crystal.

At step 1004, a specular-surface is irradiated by sequentially illuminating a plurality of sub-sets of the light-sources in accordance with a pre-defined encoding criteria. In an example, the sub-sets of LEDs are sequentially illuminated to cause switching ON/OFF for each LED to thereby exhibit a respective binary-pattern or identifier. In other example, the illumination of each LED may be controlled to exhibit different fluence-levels and thereby a specific pattern represented by a specific numeral-system.

At step 1006, reflected light-radiation from the specular-surface (e.g., flat glass panel) under consideration is captured by a camera having electronic image generation capability to thereby generate a plurality of electronic-images in accordance with the sequential-illumination of step 1004. In an example, 'k' number of images are generated in respect of the 'n' number of LEDs, each image corresponding to illumination of sub-set of LEDs.

At step 1008, each generated-image out of k images is processed in accordance with an image-processing criteria specific to the encoding criteria as has been adopted in step 1004. For example, each image out of k images may be observed to generate a bit-sequence (e.g., binary sequence) with respect to each LED, based on the switched ON/OFF state as reflected in image. Thereafter, the binary-sequence for each LED may be converted into an equivalent 'decimal number' to generate index in decimal number format for each LED in the panel. Likewise, the images may also be observed to observe a pattern of fluence-levels from each LED to identify the index of the LED based on the pattern of fluence-levels as generated for each LED. According, identity of each LED is established or any other light-source gets established.

At step 1010, topography of the specular-surface is determined determining at-least based on calculation of spatial-coordinates of the light-sources and the determined identity of each light-source. As may be understood, subsequent to the determination of index for each LED or light-source, the positional coordinates of the LEDs in three-dimension may be determined through the computing system 314 based on the description provided with respect to FIG. 2. Based upon the identity of LEDs and corresponding position-space coordinates, the topography of the specular surface may be determined at-least based on the description provided with respect to FIG. 1 in a substantially time-efficient manner with least-complexity and overhead. As may be understood, various processes appropriating the determined topography of the specular-surface are also rendered time-efficient. To name a few, certain examples of the processes are present in the ensuing description.

In an example, as a part of determination of topography of the specular-surface, the present subject matter may be further appropriated to determine shape of the specular-surface based on a "modified grid reflection technique" as illustrated in "Finot, M, Blech, I. A., Suresh, S. and Fujimoto, H., *J. Appl. Phys.*, 1997, 81, 3457". Based on the same example, the present subject matter may be appropriated to determine stress in thin-film deposited on substrate-structures based on the thin-film stress induced changes in topography of the substrate-structure.

In other-example, as a part of determination of topography of the specular-surface (say a float-glass) through the present subject matter, possible anomalies to the expected shape of the specular-surface may be determined. In this case, the process comprises loading glass-sheet and performing measurement on a tool calibrated with optical flat as described in Finot, M, Blech, I. A., Suresh, S. and Fujimoto, H., *J. Appl. Phys.*, 1997, 81, 3457". A single-run completes the process.

In yet another example, based on the determination of topography of the specular-surface (say a float-glass) through the present subject matter, "global stress" is measured by measuring of the deflection of the entire glass panel surface. In general, in order to measure the stress-induced change of topography due to the deposition of the coating on the surface of the glass, first measurement is done before the coating is deposited the bare glass or glass with previously deposited layers is inserted into the tool. Thereafter, the second measurement is done after coating is deposited. The topography of both shapes as measured is compared and global stress value is calculated. In other scenario, it may be assumed that glass had initial zero residual stress and was (in absence of gravity) perfectly flat. Accordingly, in such a scenario, the reference or uncoated glass may not be required and a single measurement is held sufficient for measuring the global stress.

In yet another example, as a part of determination of topography of the specular-surface (say a float-glass)

through the present subject matter, local-stress of the specular surface is determined based on local curvature of the specular-surface through any known existing mechanism in the art.

Figure 11:
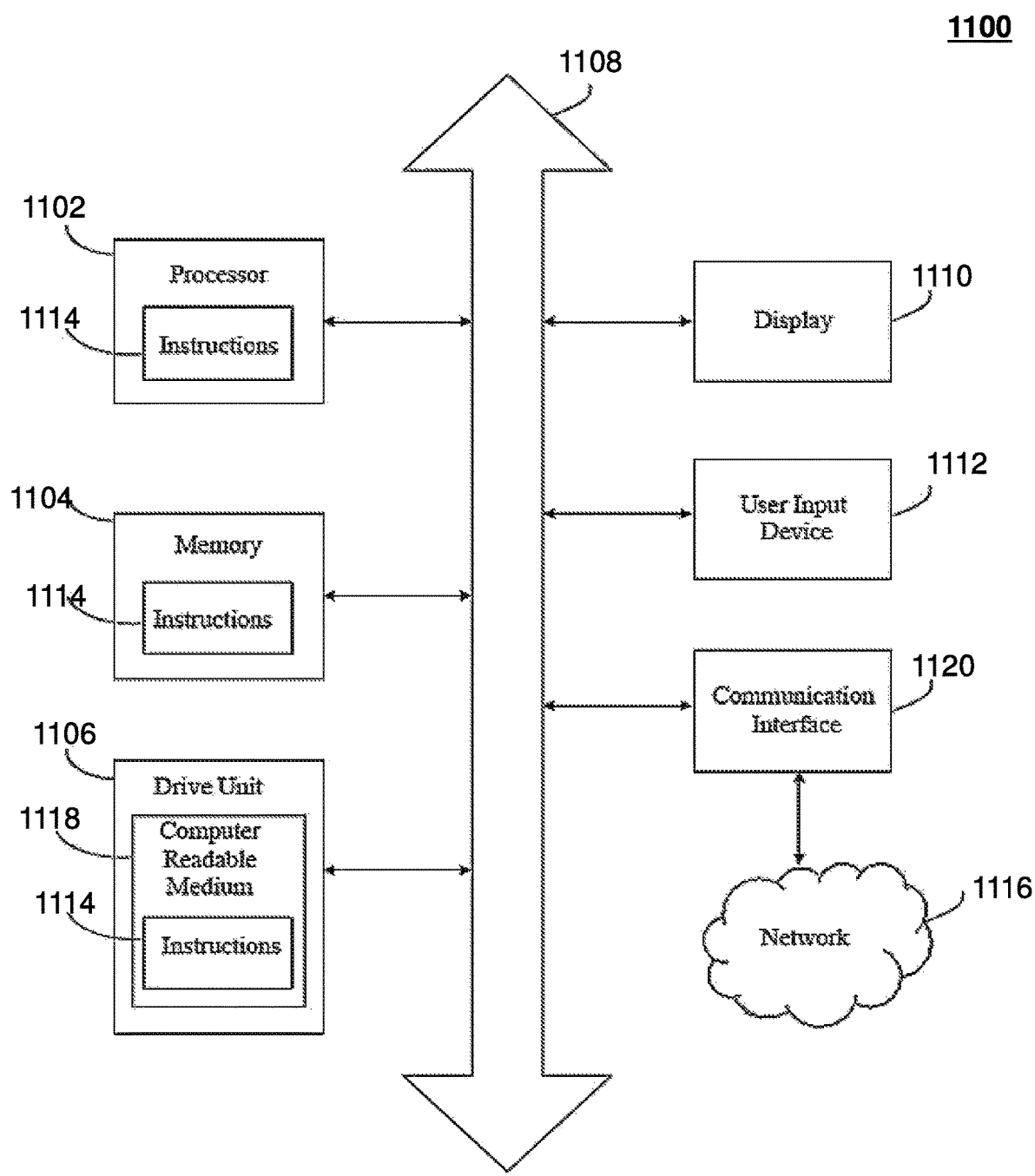
FIG. 11 illustrates an example computing system forming a part of the system for determining a topography of the specular-surface according to the present disclosure.

FIG. 11 shows yet another example implementation in accordance with the embodiment of the present disclosure by depicting a computing-system configured to control the illumination of light-sources (e.g., LEDs) as an LED controller, process the electronic images as captured by the camera and thereafter determine topography/variation in topography of the specular surfaces. More specifically, the present figure illustrates an example hardware configuration of the computing system 314 as a computing system 1100. The computing system 1100 can include a set of instructions that can be executed to cause the computing system 1100 to perform any one or more of the methods disclosed. The computing system 1100 may operate as a standalone device or may be connected, e.g., using a network, to other computing systems or peripheral devices.

In a networked deployment, the computing system 1100 may operate in the capacity of a server or as a client user computer in a server-client user network environment, or as a peer computer system in a peer-to-peer (or distributed) network environment. The computing system 1100 can also be implemented as or incorporated across various devices, such as a personal computer (PC), a tablet PC, a personal digital assistant (PDA), a mobile device, a palmtop computer, a laptop computer, a desktop computer, or any other machine capable of executing a set of instructions (sequential or otherwise) that specify actions to be taken by that machine. In an example implementation, the computing system 1100 may be a mobile computing cum display device capable of being used by a user. Further, while a single computing system 1100 is illustrated, the term "system" shall also be taken to include any collection of systems or sub-systems that individually or jointly execute a set, or multiple-sets, of instructions to perform one or more computing functions.

The computing system 1100 may include a processor 1102 e.g., a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data The processor 1102 may implement a software program, such as code generated manually (e.g. programmed).

The computing system 1100 may include a memory 1104, such as a memory 1104 that can communicate via a bus 1108. The memory 1104 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1104 includes a cache or random access memory for the processor 1102. In alternative examples, the memory 1104 is separate from the processor 1102, such as a cache memory of a processor, the system memory, or other memory. The memory 1104 may be an external storage device or database for storing data. The memory 1104 is operable to store instructions executable by the processor 1102. The functions, acts or tasks illustrated in the figures or described may be performed by the programmed processor 1102 executing the instructions stored in the memory 1104. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As illustrated, the computing system 1100 may or may not further include a touch-sensitive display unit 1110, for outputting determined information as well as receiving a user's touch-gesture based inputs, such as drag and drop, single tap, multiple-taps, etc. The display 1110 may act as an interface for the user to see the functioning of the processor 1102, or specifically as an interface with the software stored in the memory 1104 or in the drive unit 1106.

Additionally, the computing system 1100 may include an input device 1112 configured to allow a user to interact with any of the components of system 1100. The computing system 1100 may also include a disk or optical drive unit 1106. The disk drive unit 1106 may include a computer-readable medium 1118 in which one or more sets of instructions 1114, e.g., software, can be embedded. Further, the instructions 1114 may embody one or more of the methods or logic as described. In a particular example, the instructions 1114 may reside completely, or at least partially, within the memory 1104 or within the processor 1102 during execution by the computing system 1100.

The present disclosure contemplates a computer-readable medium that includes instructions 1114 or receives and executes instructions 1114 responsive to a propagated signal so that a device connected to a network 1126 can communicate voice, video, audio, images or any other data over the network 1126. Further, the instructions 1114 may be transmitted or received over the network 1116 via a communication port or interface 1120 or using a bus 1108. The communication port or interface 1120 may be a part of the processor 1102 or may be a separate component. The communication port 1120 may be created in software or may be a physical connection in hardware. The communication port 1120 may be configured to connect with a network 1116, external media, the display 1110, or any other components in computing system 1100, or combinations thereof. The connection with the network 1116 may be established wirelessly as discussed later. Likewise, the additional connections with other components of the system 1100 may be established wirelessly. The network 1116 may alternatively be directly connected to the bus 1108.

The network 1116 may include wireless networks, Ethernet AVB networks, or combinations thereof. The wireless network may be a cellular telephone network, an 802.11, 802.16, 802.20, 802.1Q or WiMax network. Further, the network 1116 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet switched network transmission (e.g., TCP/IP, UDP/IP, HTML, HTTP) may be used.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A system for measurement of topography of specular surfaces, the system comprising:
   a set of indexed light-sources;
   a controller configured to drive the set of light-sources to irradiate a specular-surface by sequentially illuminating a plurality of sub-sets of light-sources of the set of light sources in accordance with a pre-defined encoding criteria;
   at-least one camera configured to capture reflected light-radiation from the specular-surface and thereby generate a plurality of images in accordance with the sequential-illumination, wherein each of the generated-images corresponds to a particular sub-set of illuminated light sources; and
   a processing system configured to perform operations comprising:
      process each generated image in accordance with an image-processing criteria specific to the encoding-criteria to determine one or more index of light-sources and thereby identify the light-sources within the images; and
      determine topography of the specular-surface at-least based on calculation of spatial-coordinates and the determined identity of each light-source.

2. The system as claimed in claim 1, wherein each of the light-sources includes one or more of a:
   a light emitting diode;
   an incandescent source;
   a fluorescent light source; and
   a liquid-crystal.

3. The system of claim 1, wherein the specular surface includes a substrate-structure with film deposited thereon and the operations further comprise determine stress in the film deposited on the substrate-structure based on determining stress-induced changes in topography of the substrate-structure as determined from the determined topography.

4. A system for measurement of topography of specular surfaces, the system comprising:
   an LED panel comprising a set of indexed LEDs;
   a LED-controller configured to drive the LED panel for irradiating a specular-surface by sequentially illuminating a plurality of sub-sets of the LEDs within the panel in accordance with a pre-defined encoding criteria;
   at least one camera configured to capture reflected light-radiation from the specular-surface and thereby generate a plurality of images in accordance with the sequential-illumination, wherein each of the generated image corresponds to a particular sub-set of illuminated LEDs; and
   a processing system configured to:
      process each generated image in accordance with an image-processing criteria specific to the encoding-criteria to determine one or more index of LEDs and thereby identify the LEDs of panel within the images; and
      determine topography of the specular-surface at-least based on calculation of spatial-coordinates and the determined identity of each LED.

5. The system of claim 4, wherein the specular surface includes a substrate-structure with film deposited thereon and the operations further comprise determine stress in the film deposited on the substrate-structure based on determining stress-induced changes in topography of the substrate-structure as determined from the determined topography.

6. The system as claimed in claim 4, wherein the LED controller as a part of executing the pre-defined encoding criteria is configured to:
   determine binary-identifiers of the indexes of 'n' number of LEDs within the panel;
   compute a binary-logarithm 'k' with respect to 'n' number of LEDs, wherein k=$\log_2$ n and $2^k \geq n-1$;
   create 'k' number of sub-sets of LEDs in the panel, wherein each of the sub-set of LEDs denotes a pre-defined number of LEDs less than 'n' number of LEDs; and
   illuminate the 'k' sub-sets of the LEDs in the panel in accordance with a pre-defined sequence to cause switching on/off each LED in accordance with the respective binary identifier.

7. The system as claimed in claim 6, wherein the camera comprises electronics to generate electronic-images based on received light and is configured to generate the number of images with respect to number of sub-set of illuminated LEDs.

8. The system as claimed in claim 6 wherein the processing system as a part of executing the image-processing criteria is further configured to:
   assign index j to the k number of generated images, where j=0, . . . , k; and
   calculate the index as an integer number from a binary-identifier gathered for each LED from k number of generated images at-least based on:

$$i = \sum_{ii=0}^{k} a_j^i 2^{ii}$$

wherein,
   i denotes the index as an integer number for each LED in the currently processed image;
   j denotes an index for the currently processed image;
   ii is a bit-number with respect to the binary-identifier for the LED; and for each image having index j, the LED having index i is ON when $a_j^i=1$ and OFF when $a_j^i=0$.

9. The system as claimed in claim 5, wherein the processing system is further configured to:
   transform the generated images into a set of binary images $I_n$ by applying a first pre-defined threshold value;
   further transform the set of binary images $I_n$ into a set of black/white images $\tilde{I}_n$ by applying a second pre-defined threshold value (T) at-least based on:

$$\tilde{I}_n(x,y)=\theta(I_n(x,y)>T)$$

assign each of m centroids observed within the set of black/white images $\tilde{I}_n$ an integer index number Index [m] at-least based on:

$$\text{Index}[m] = \sum_{n=0}^{k} 2^n \cdot \tilde{I}_n(x_m, y_m)$$

wherein each of the assigned integer index number [m] corresponds to a pre-assigned index (index j=m) to each of centroids corresponding to the LEDs detected by the camera in a detector frame of reference using image of the LED panel in a fully illuminated state, each of the centroid having been pre-identified in the detector-frame of the camera in terms of discrete coordinates $x_j$, $y_j$.

10. The system as claimed in claim 4, wherein the processing system is configured to determine the spatial coordinates for each LED in the panel based on:
    the determined index for each LED from the image; and
    a comparison between at least two different set of images, the different set of images formed due to at least two positions of the specular surface differing by a predetermined distance separated by known distance H.

11. The system as claimed in claim 5, wherein the LED controller is configured to drive the LED panel in accordance with another encoding criteria based on:
    determining an identifier as a part of indexing of 'n' number of LEDs within the panel, the identifier being in accordance with a numeral-system shortlisted from a plurality of numeral-systems based on 'f' number of fluence levels for each LED;
    computing a logarithm 'k' with respect to the 'f' number of fluence levels of 'n' number of LEDs, wherein $k(f)=\log_f n$ and denotes a smallest integer such that $f^k \geq n-1$;
    creating 'k' number of sub-sets of LEDs in the panel, wherein each of the sub-set of LEDs denotes a pre-defined number of LEDs less than 'n' number of LEDs; and
    illuminating the 'k' sub-sets of the LEDs in the panel in accordance with a pre-defined sequence to cause illumination-control with respect to each LED in accordance with the respective identifier.

12. The system as claimed in claim 5, wherein the specular surface corresponds to a flat panel display.

13. The system as claimed in claim 5, wherein the processing system is further configured to determine:
    a global stress based on topography of the specular surfaces or changes in topography thereof; and
    a local stress based on a local curvature of the specular surface.

14. A method for measurement of topography of specular surfaces, the method comprising:
    (a) indexing a set of light-sources;
    (b) irradiating a specular-surface by sequentially illuminating a plurality of sub-sets of the light-sources in accordance with a pre-defined encoding criteria;
    (c) capturing reflected light-radiation from the specular-surface and thereby generating a plurality of images in accordance with the sequential-illumination, wherein each of the generated image corresponds to a particular sub-set of illuminated sources;
    (d) processing each generated image in accordance with an image-processing criteria specific to the encoding-criteria to determine one or more index of light-sources and thereby identify the light-sources within the images; and
    (e) determining topography of the specular-surface at-least based on calculation of spatial-coordinates and the determined identity of each light-source.

15. The method of claim 14, wherein the set of light-sources includes a set of LEDs in an LED panel.

16. The method of claim 14, wherein the specular-surface includes a plan substrate and the method further comprises:
    determining first topography data of the plane substrate prior to a thin-film deposition on the plane substrate according to operations (a)-(e);
    measuring determining second topography data of the plane substrate having the thin-film deposited thereupon according to operations (a)-(e); and
    detecting a stress in the thin-film deposited on the plane substrate based on a comparison between the first topography data and the second topography data.

* * * * *